Figure 1:
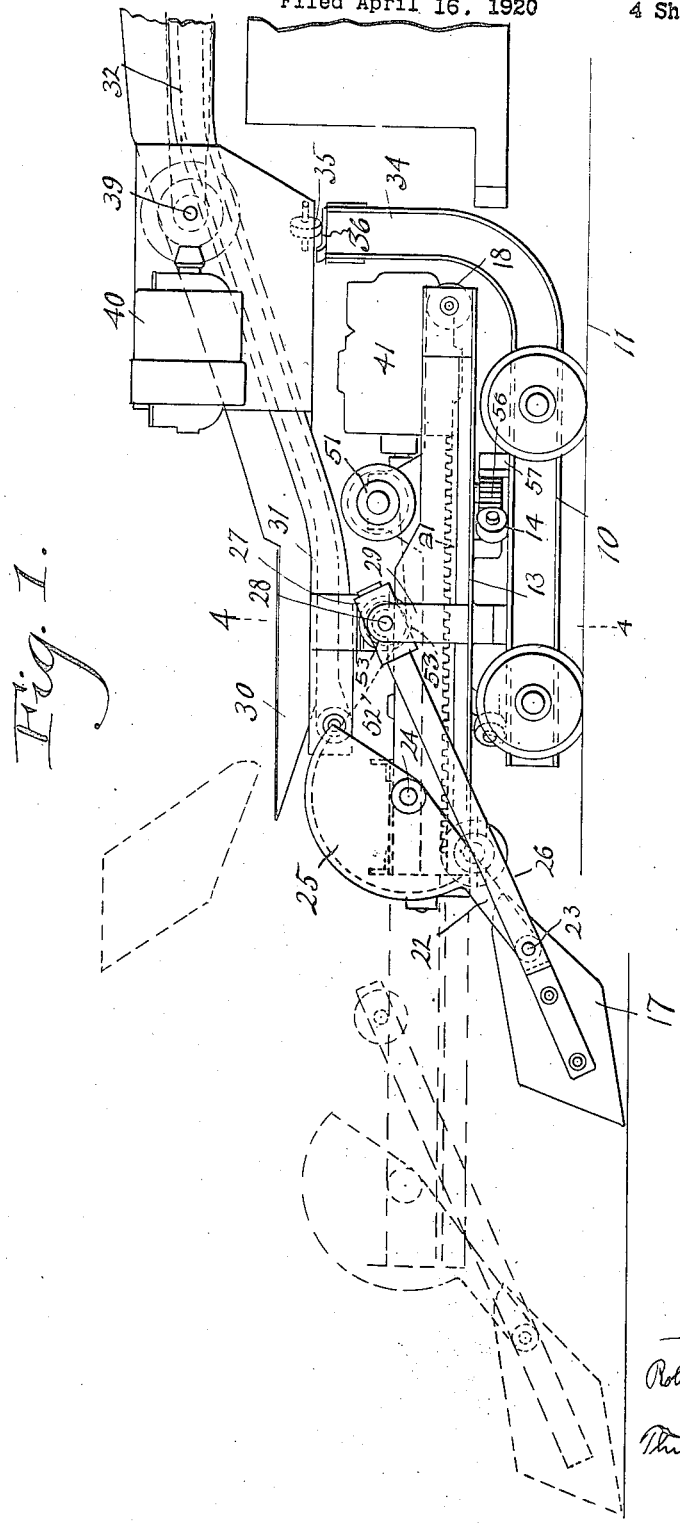

Dec. 18, 1923.

R. P. GREENLEAF

LOADING MACHINE

Filed April 16, 1920  4 Sheets-Sheet 1

1,477,754

Inventor
Robert P. Greenleaf
by
Thurston Kwis & Hudson
attys.

Dec. 18, 1923.
R. P. GREENLEAF
LOADING MACHINE
Filed April 16, 1920  4 Sheets-Sheet 3
1,477,754
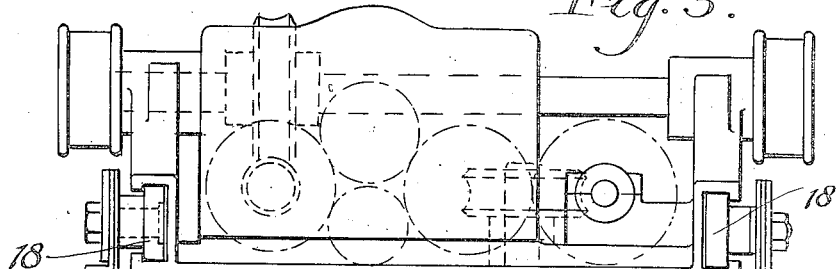
Fig. 3.
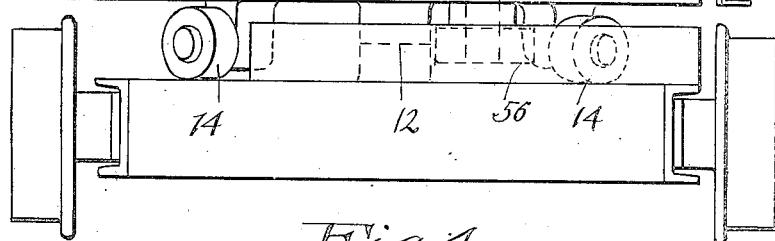
Fig. 4.
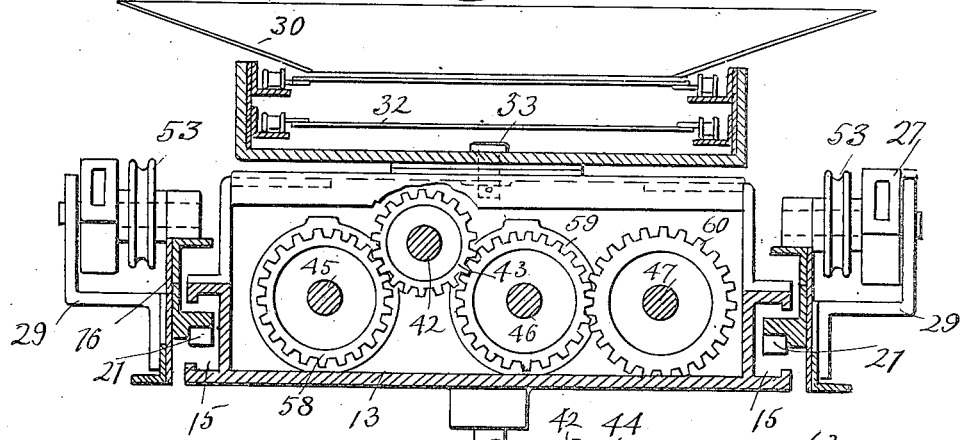
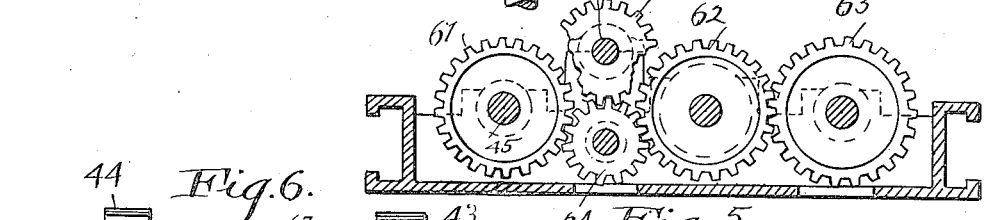
Fig. 6.   Fig. 5.
Inventor
Robert P. Greenleaf
by Thurston Kwis & Hudson
attys.

Dec. 18, 1923.

R. P. GREENLEAF
LOADING MACHINE
Filed April 16, 1920

1,477,754

4 Sheets-Sheet 4

Inventor
Robert P. Greenleaf
by Thurston Knox & Hudson
Attys

Patented Dec. 18, 1923.

1,477,754

UNITED STATES PATENT OFFICE.

ROBERT P. GREENLEAF, OF CLEVELAND, OHIO, ASSIGNOR TO FRANK BILLINGS, OF CLEVELAND, OHIO.

LOADING MACHINE.

Application filed April 16, 1920. Serial No. 374,326.

*To all whom it may concern:*

Be it known that I, ROBERT P. GREENLEAF, a citizen of the United States, residing at Cleveland, in the county of Cuyahoga and State of Ohio, have invented a certain new and useful Improvement in Loading Machines, of which the following is a full, clear, and exact description.

The present invention relates to a loading machine of the type having a shovel which is designed to be given a filling stroke or movement at the front of the machine and then to be swung upwardly and rearwardly over the machine to dumping position.

The principal object of the invention is to provide a loading machine with a shovel for scooping up a load and swinging it to discharging position, and with a conveyor having its receiving end located well forward of the machine so that the rear stroke of the shovel will not be excessive.

A further object is to provide means whereby when the shovel is swung upward the shovel will be tilted with reference to the shovel supporting arms so as to minimize head room occupied by the swinging mechanism when at its highest point.

Still further the invention aims to so mount the conveyor that the rear part may be swung about the axis of the forward end thereof, or of a receiving hopper associated therewith, and to arrange the conveyor and turntable which carries the operating parts to swing about coincident axes so that the conveyor can be arranged to discharge into cars, no matter how they are located with reference to the machine, and without affecting or being affected by the movements of the turntable, thus enabling the machine to work effectively when positioned on the curve of a track, and allowing the cars to be filled if the machine is on a straight track and the cars are not directly behind the machine.

Additionally the invention aims to provide an improved mechanism for actuating the shovel, i. e. for giving it its filling and dumping movements with an actuating mechanism employing a single motor, together with means by which straight line and tilting movements can be imparted to the shovel either separately or simultaneously and to the desired amounts to produce efficiency in action.

The invention may be briefly summarized as consisting in certain novel details of construction and combinations and arrangements of parts which will be described in the specification and set forth in the appended claims.

Figure 2:
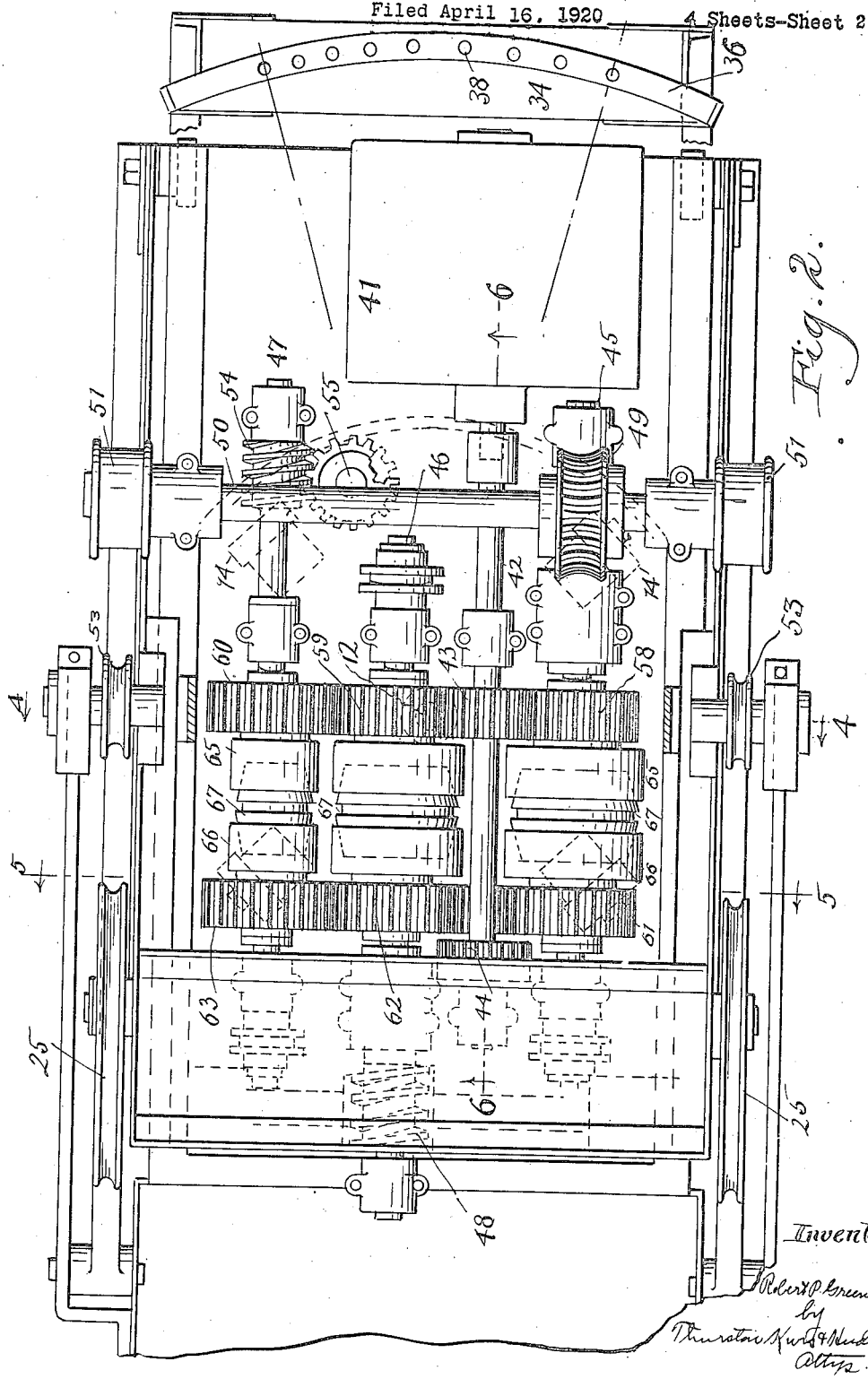
Figure 7:
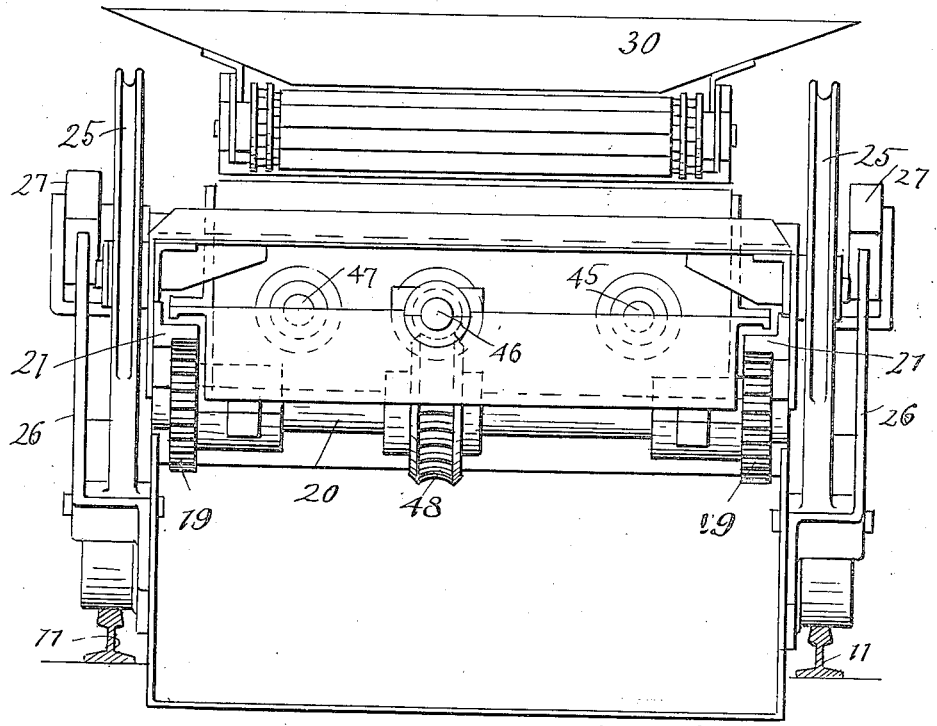
Figure 8:
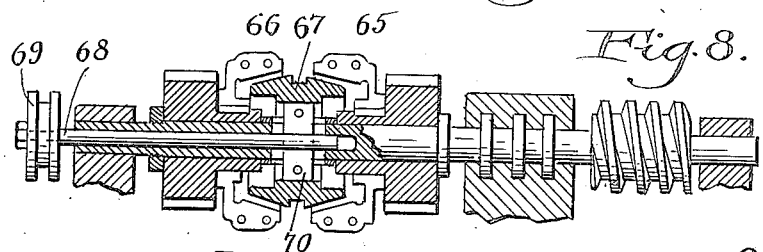
Figure 9:
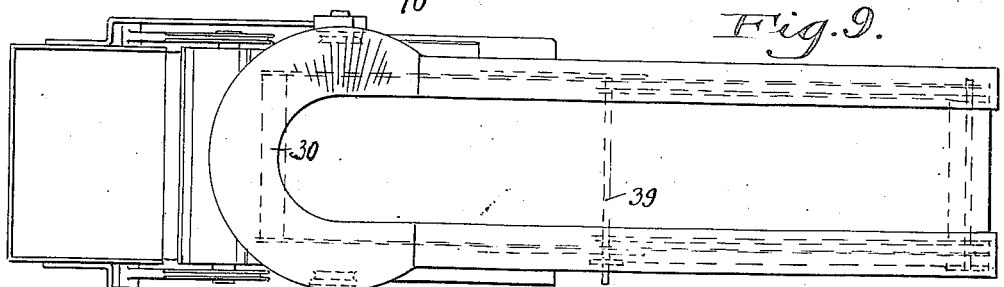
Figure 10:
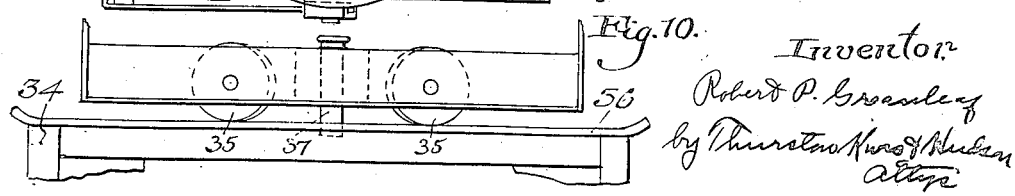

In the accompanying sheets of drawings, Fig. 1 is a side view of the machine with the rear part of the conveyor omitted; Fig. 2 is a top plan view of the machine omitting the conveyor and receiving hopper therefor, but illustrating the shovel actuating mechanism; Fig. 3 is a rear end view omitting the conveyor; Fig. 4 is a transverse sectional view substantially along the line 4—4 of Fig. 1; Fig. 5 is a cross-sectional view substantially along the line 5—5 of Fig. 2 looking in the direction indicated by the arrows; Fig. 6 is a sectional view substantially along the line 6—6 of Fig. 2 looking in the direction indicated by the arrows; Fig. 7 is a front view of the machine; Fig. 8 is a detail sectional view of one of several clutches used in the machine; Fig. 9 is a plan view of the machine on a reduced scale; and Fig. 10 is a rear end view of a portion of the machine illustrating the manner in which the rearwardly projecting part of the conveyor is adapted to be supported on the main frame.

Referring now to the drawings it will be seen that the machine includes a wheeled truck 10, adapted to run along a track such as indicated at 11, which track may be in a mine. Rotatably supported on the frame of the truck to turn about an axis 12, is a rotary superstructure or turntable 13 carrying all the operating parts of the machine, which turntable is supported on the truck through rollers 14. On opposite sides of the turntable are a pair of guideways 15, (see particularly Fig. 4) for a forwardly and rearwardly movable ram 16 which supports a shovel 17 mounted thereon in a manner to be hereinafter described. The rear part of the ram has rollers 18 designed to travel back and forth in the guideways 15 while the forward part of the ram is supported on a pair of shrouded pinions 19 which are mounted on a shaft 20 at the front part of the turntable (see Fig. 7) and engage racks 21 carried by the ram, and when rotated, move the ram backward or forward.

The shovel 17 is connected to the ram by two pairs of arms. One pair of arms 22 which support and actuate the shovel are pivotally connected at 23 to opposite sides of the shovel, and are pivotally connected at 24 to the sides of the ram near the forward end of the latter, said arms having in this instance, concentric with their pivotal axis 24, rope segments 25, the purpose of which will be subsequently explained. The other pair of arms which control the tilting of the shovel with reference to the arms 22 are secured to opposite sides of the shovel. The inner portions of these arms are adapted to slide freely in members 27 pivoted to turn on pins 28 supported partly by the ram and partly by brackets 29 which are secured to the ram about midway between the ends thereof.

The shovel is adapted to be moved forwardly with the ram to receive a load, and when retracted, to be swung upwardly to upper dotted position, indicated in Fig. 1, so as to discharge the material into a hopper 30 supported at the top of the machine. This hopper which has a frustro-conical front portion and rearwardly extending side portions, is carried on a conveyor frame 31 having an endless conveyor 32 by which the material is conveyed from the hopper to the rear of the machine and discharged into cars. The hopper and front part of the conveyor frame are supported on the turntable 13, and are connected thereto pivotally by a king bolt 33 or equivalent pivoting device, the axis of the latter coinciding with the axis of movement of the turntable on the truck.

The rear end of the conveyor frame extends beyond the rear end of the truck 10, and it is supported on the rear upward extension 34 of the truck frame through the medium of rollers 35. These rollers are adapted to bear on an arc-shaped track 36 carried on the upper rear frame extension 34 to which the conveyor may be secured in any desired position with respect to the truck frame by a pin 37 which is carried by the conveyor frame, and is adapted to be inserted in any one of the series of holes 38 with which the track 36 is provided, as clearly shown in Figs. 2 and 10. Thus the conveyor as a whole, and the hopper can be turned about the front pivotal axis 33 so that the rear end of the conveyor will discharge material into receiving cars though they may not be directly behind the machine. Furthermore, it will be apparent that due to the manner in which the conveyor frame and hopper are supported at their front ends the turntable can be swung about its pivotal axis 12 without affecting the position of the conveyor frame. The conveyor can be actuated in any suitable manner as by means of a shaft 39 driven by a motor 40 and supported on the conveyor frame as indicated in Fig. 1.

Power for actuating the ram, for swinging the shovel, and for turning the turntable is in this instance derived from a single motor 41 mounted on the rear part of the turntable, which motor may be a rotary electric or other suitable continuously operating motor. The mechanism by which movements are imparted either simultaneously or separately to the several elements of the machine from this single motor forms an important part of the present invention, and this will now be described. By reference particularly to Fig. 2 it will be seen that the motor 41 drives a forwardly extending shaft 42, on which are secured, a suitable distance apart, two actuating pinions 43 and 44. Mounted on the turntable alongside this shaft 42 are three shafts 45, 46, and 47.

The forward end of the middle shaft 46 is connected by worm gearing 48 (see Figs. 2 and 7) to the transverse front shaft 20 carrying the pinions 19 which actuate the ram. The shaft 45 has its rear end connected by worm gearing 49 to an upper rear transverse shaft 50, on the ends of which are a pair of rope or cable drums 51 adapted to accommodate cables, indicated at 52 in Fig. 1, which cables in this instance extend from the lower sides of the drums under sheaves 53 carried by the ram and then around the segments 25 to which they are attached, which segments are attached to, or form part of the shovel actuating arms 22. The third shaft 47, has its rear end connected by worm gearing 54 to a short vertical shaft 55 provided at its lower end (see Fig. 3) with a pinion 56 which engages a segmental rack 57 on the truck frame beneath the turntable so that by the rotation of this shaft 47 in one direction or the other, the turntable and all parts carried by it will be swung about the pivotal axis of the turntable in order that material may be scooped up by the shovel at either point of the machine.

On the shafts 45, 46 and 47 I provide gears 58, 59 and 60, which gears are arranged opposite the motor driven gear 43. The gears 58 and 59 both engage the gear 43, and the gears 59 and 60 mesh with each other so that the gears 58, 43, 59 and 60 are driven as one train, or in unison as long as the motor is in operation.

Forwardly of the gears 58, 59 and 60 I provide on the three shafts three gears 61, 62 and 63, the gears 62 and 63 being in driving engagement, and beneath the motor driven shaft 42 I provide a long gear 64 which is in engagement with the motor driven gear 44 and with the two gears 61 and 62. In consequence, as long as the motor is in operation, the gears 61, 62 and 63 will be driven, but each of these gears will be driven in the reverse direction to the other gear on the same shaft, that is to say, gears 58 and 61 on shaft 45 will be driven in opposite directions, and the same is true of gears 59 and 62 on shaft 46, and gears 60 and 63 on shaft 47.

Additionally I provide on each shaft so as to be driven by the oppositely rotating gears 58 and 61, 59 and 62, and 60 and 63, cone clutch elements 65 and 66, and on each shaft between these two clutch elements I provide a shiftable clutch element 67 adapted to be shifted either into engagement with the clutch element 65 or the clutch element 66. This middle clutch element may be moved axially of the associated shaft by suitable means such as a rod 68 extending endwise for a distance through the shaft and provided at its end with a shifter ring 69 which can be engaged by a part controllable from any desired part of the machine. In this instance the inner end of the rod 68 which extends axially of the shaft 45, 46 or 47 is connected to a transverse piece 70 which is connected to the middle clutch element 67, and is movable back and forth in a slot of the shaft.

It will be seen therefore, that when the middle clutch elements 67 are in neutral position, the motor 41 can be operated continuously without imparting movement to the ram, shovel or turntable, the gears 58, 59, 60 and 61, 62 and 63, and the clutch elements 65 and 66 then rotating idly, the parts of one set rotating oppositely to the corresponding parts of the other set.

To operate the machine, assuming that the ram is retracted and the shovel is lowered, at which time the point or digging edge of the shovel may be resting directly on the ground, the operator by shifting in the right direction the middle clutch element 67 on shaft 46, gears the motor shaft to the front cross shaft 20. This causes the ram and shovel to be moved outwardly. At the same time the operator shifts in the right direction on shaft 45 the middle clutch element 67 so as to cause the rear cross shaft 50 to be rotated in a direction such that the cables 52 will be paid out, and thus not exert lifting action on the shovel. At or near the end of the forward stroke of the ram, which stroke can be as long as desired within the limits of the machine, the operator will unclutch the drum shaft 50, and due to the fact that self-locking worm gearing is employed in every instance in this machine, the shovel will be elevated if the forward movement of the ram is continued after the unclutching referred to. This may be done for the purpose of giving the shovel a full load. Or after the forward movement of the ram is discontinued, the operator may by operating the drum shaft clutch in the reverse direction, wind up the cables and elevate the shovel independently of the ram movement. When the shovel is loaded either with or without elevating it off the ground, the ram is retracted by reversing the ram clutch on shaft 46, and at the same time the drum shaft 50 and drums 51 are rotated through the medium of the clutch on shaft 45 so as to wind in the cables, in which event the shovel is brought back toward the front of the machine. Then when the ram is fully retracted, the ram is unclutched from the motor and the drum shaft is allowed to continue its rotation, winding in the cables. The effect of this is to swing the shovel upwardly until dumping position is reached, the tilting arms 26 then swinging the shovel somewhat with reference to the shovel arms 22. When dumping position is reached, the material is discharged into the hopper 30 and the swinging movement of the shovel is stopped either manually or automatically. In the latter event, any suitable means will be provided for automatically throwing out the clutch controlling the drum shaft when the shovel reaches dumping position.

Then the clutch on shaft 45 controlling the drum shaft is reversed, and this rotates the drum shaft in the reverse direction to that in which it was previously rotated, paying out the cables and allowing the shovel to swing back to its lowered position in front of the machine. If desired, spring buffers or equivalent devices may be utilized to check and stop the upward movement of the shovel, and to start the shovel on its downward swing independently of the movement which is imparted by the force of gravity. It may be desired that the shovel be swung upward to a point such that the center of gravity passes beyond the pivotal axis of the shovel arms on the ram, in which event the shovel would not swing by gravity and buffers or equivalent devices would be necessary.

Thus the operator by shifting the clutches on the shafts 45 and 46 is enabled to load material which is in front of the machine into the overhead hopper, and from this hopper it will be conveyed by the conveyor and discharged into cars more or less to the rear of the machine, though as before stated, it is not essential that these cars be directly behind the machine, but the rear end of the conveyor can be swung laterally, and since the front end of the hopper is frustro-conical, the material will be received in the hopper when the shovel is in dumping position regardless of the angle to which the conveyor is turned.

When the operator desires to reach material at either side of the machine, he operates the clutch on shaft 47, turning the turntable in the direction and to the extent desired. It should be noted that though the front part of the conveyor and hopper are mounted in effect on the turntable, the turntable can be shifted in the manner just stated without in the least affecting the discharge of material from the shovel to the hopper, this being due to the fact that the turntable and conveyor are mounted to turn on coincident axes, and also to the fact that the axis of movement of the turntable coincides with the axis or center of the conical portion of the hopper.

While I have shown one embodiment of my invention, that being a simple one which can be employed to advantage, it may be desirable for mechanical reasons to depart somewhat from the construction shown. For example, while it is essential that the type of machine herein disclosed that the speed of the cables which actuate the shovel arms and shovel, and the speed of the ram be the same, when the ram is moved back and forth in order that the shovel may be retained in a fixed relation to the moving arm when desired, nevertheless it is not essential that the cables be connected to the shovel arms directly, or if directly attached, that they pass around arc-shaped segments as herein illustrated. It might be desirable, and it would be perfectly feasible to employ elliptical or eccentric segments for the purpose of getting the greatest power at the time of the greatest resistance to movement of the shovel, or if desired, the power exerted by the cables could be transmitted to the shovel arms through power multiplying gearing so as to avoid the necessity of a large actuating motor.

Having described my invention, I claim:

1. In a loading machine, a frame, a ram guided on the frame for substantially horizontal movement forwardly and rearwardly, a shovel pivotally connected thereto, and a motor having independent mechanical connections with the ram and shovel for moving the ram forwardly and rearwardly to cause the shovel to receive a load and to retract the shovel and load and for swinging the shovel for dumping purposes.

2. In a loading machine, a frame, a ram movable forwardly and rearwardly with respect thereto, a shovel pivotally connected to the ram so that it may be swung upwardly over the machine to dumping position, power means for operating the ram, a cable connected to the shovel for swinging it, and a drum for winding in and paying out the cable as the ram is moved in and out, at the same speed that the ram is moved.

3. In a loading machine, a frame, a ram movable forwardly and rearwardly with respect thereto, a shovel pivotally connected to the ram so that it may be swung upwardly over the machine to dumping position, power operated means for shifting the ram, a cable operatively connected to the shovel for swinging or rotating it, a drum shaft for paying out and winding in the cable, and power operated means for rotating the drum shaft so that the cable may be paid out or wound in as the ram is moved.

4. In a loading machine, a frame, a ram movable forwardly and rearwardly with respect to the frame, a shovel pivotally connected to the ram so that it may be swung upwardly over the machine to dumping position, a drum shaft on the frame, a cable connected to the drum shaft and to the shovel, a motor on the frame and connections between the motor and the ram and the drum shaft.

5. In a loading machine, a frame, a ram movable forwardly and rearwardly with respect thereto, a shovel pivotally connected to the ram so that it may be swung upwardly over the machine to dumping position, a motor mounted on the frame, power operated means adapted to be mechanically connected to the motor for shifting the ram, a cable operatively connected to the shovel for swinging it, a drum shaft and drum mounted on the frame for paying out and winding in the cable, power operated means adapted to be connected to the motor for operating the drum shaft, and clutches by which the first and second operated means may be controlled at will.

6. In a loading machine, a frame having a turntable, a ram mounted on the turntable, a shovel pivotally connected to the ram so that it may be swung upwardly and downwardly with respect thereto, and a conveyor having its receiving end at the top of the machine and connected to the turntable on an axis coincident with the axis of connection between the turntable and frame.

7. In a loading machine, a frame, a turntable on the frame adapted to swing about a vertical axis, a ram movable forwardly and rearwardly with respect to the turntable, a shovel pivotally connected to the ram so that it may be swung upwardly and downwardly with respect thereto, a conveyor extending over the machine and having a receiving hopper whose front end is circular, the axis of the circular part coinciding with the axis of movement of the turntable whereby the shovel may be swung upwardly and will discharge material into the hopper irrespective of the position of the turntable.

8. In a loading machine, a frame, a turntable adapted to be turned on a vertical axis, a shovel, means for supporting and operating it so that it may be filled at the front of the machine and may then be swung upwardly to dumping position, a conveyor at the top of the machine and having its discharge end at the rear thereof and its receiving end over the turntable, the rear part of the turntable being laterally movable about the axis of movement of the turntable.

9. In a loading machine, a frame, a turntable mounted on the frame to turn about a vertical axis, a pivoted shovel adapted to be swung upwardly to dumping position at the top of the machine, a conveyor having its rear end beyond the rear end of the frame and having its receiving end over the turntable, the forward end of the conveyor being pivotally connected to the turntable on an axis coinciding with the pivotal connection of the turntable with the frame.

10. In a loading machine, a frame, a turntable mounted on the frame to turn about a vertical axis, a shovel supported from the turntable so that it may be swung upwardly to dumping position, a conveyor having its rear end beyond the rear end of the frame and having its receiving end over the turntable, the forward end of the conveyor being pivotally connected to the turntable on an axis coinciding with the pivotal connection of the turntable with the frame, and means for supporting the rear part of the conveyor on the frame independently of the turntable.

11. In a loading machine, a frame, a turntable mounted on the frame to turn about a vertical axis, a shovel pivotally supported from the turntable so that it may be swung upwardly to dumping position, a conveyor having its rear end beyond the rear end of the frame and having its receiving end over the tunntable, the forward end of the conveyor being pivotally connected to the turntable on an axis coinciding with the pivotal connection of the turntable with the frame, the rear part of the frame having an upward extension at the rear of the turntable, said extension having a portion of the conveyor supported thereon.

In testimony whereof I hereunto affix my signature.

ROBERT P. GREENLEAF.